(12) United States Patent
Paduchuru et al.

(10) Patent No.: US 12,190,378 B2
(45) Date of Patent: Jan. 7, 2025

(54) SYSTEM AND METHOD FOR QUALITATIVE AND QUANTITATIVE DATA ANALYSIS FOR GENERATING ALERTS

(71) Applicant: JPMorgan Chase Bank, N.A., New York, NY (US)

(72) Inventors: Sunil Paduchuru, Bangalore (IN); Navneet Baweja, East Meadow, NY (US); Ninad Gawad, Jersey City, NJ (US); Kopinesh Patil, Mumbai (IN); Shubhashis Dasgupta, Edison, NJ (US); Girija Penumarti, East Brunswick, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/660,297

(22) Filed: Apr. 22, 2022

(65) Prior Publication Data

US 2023/0289877 A1    Sep. 14, 2023

(30) Foreign Application Priority Data

Mar. 10, 2022    (IN) .............. 202211013064

(51) Int. Cl.
*G06Q 40/04*    (2012.01)
*G06F 16/27*    (2019.01)
(Continued)

(52) U.S. Cl.
CPC ............. *G06Q 40/04* (2013.01); *G06F 16/27* (2019.01); *G06N 5/025* (2013.01)

(58) Field of Classification Search
CPC ......... G06Q 40/04; G06F 16/27; G06N 5/025
(Continued)

(56) References Cited

U.S. PATENT DOCUMENTS 10,409,367 B2 *    9/2019    Velez-Rojas et al. .. G06F 3/013
11,126,505 B1 *    9/2021    Vig et al. ............ G06F 11/1451
(Continued)

OTHER PUBLICATIONS

Tiwari et al.,Machine Learning in Financial Market Surveillance: A Survey, Nov. 25, 2021, IEEEAccess, vol. 9, 2021, pp. 159734-159754. (Year: 2021).*

(Continued)

*Primary Examiner* — Scott C Anderson
*Assistant Examiner* — George N. Proios
(74) *Attorney, Agent, or Firm* — GREENBLUM & BERNSTEIN, P.L.C.

(57) ABSTRACT

Various methods, apparatuses/systems, and media for qualitative and quantitative data analysis are disclosed. A processor accesses a plurality of data sources to extract a plurality of supervision data; creates a data model based on the plurality of supervision data; implements a rule engine that is configured to apply qualitative and quantitative data analysis algorithm on the extracted plurality of supervision data and the data model; implements artificial intelligence or machine learning algorithm to generate a knowledge graph based on the data model; detects outlier behavior data from the plurality of supervision data by integrating the rule engine and the AI/ML algorithm; analyzes the outlier behavior data; generates alerts data based on analyzing the outlier behavior data; and transmits the alerts data to a user computing device for taking remedial actions in correspondence with the alerts data.

17 Claims, 14 Drawing Sheets

(51) Int. Cl.
*G06N 5/02* (2023.01)
*G06N 5/025* (2023.01)

(58) Field of Classification Search
USPC .......................................... 705/37
See application file for complete search history.

(56) References Cited

U.S. PATENT DOCUMENTS

| | | |
|---|---|---|
| 11,509,674 B1* | 11/2022 | Beauchesne et al. ................. H04L 63/1425 |
| 11,816,790 B2* | 11/2023 | Devaranjan et al. ... G06T 17/00 |
| 2018/0082193 A1* | 3/2018 | Cormier et al. ....... G06N 5/025 |
| 2019/0378051 A1* | 12/2019 | Widmann et al. ... G06N 99/005 |
| 2020/0334680 A1* | 10/2020 | Vanga et al. ....... G06Q 20/4016 |

OTHER PUBLICATIONS

Nowak-Brzezińska et al. Qualitative Data Clustering to Detect Outliers. Jul. 7, 2021, Entropy (Basel), PMID: 34356410; PMCID: PMC8307081. (Year: 2021).*

* cited by examiner

```
spRule.yaml
 1  rulesConfig:
 2    includes:
 3      - /config/iPlob/scalaRules/ruleDefault.yaml
 4      - /config/customList/dataInclude.yaml
 5      - /config/customList/dataExclude.yaml
 6
 7    defaults:
 8      lob: US
 9      isRunRegionalCode: true
10      ruleProcessorClass: ScalaRuleProcessor
11      globalRulePackage: global
12      regionalRulePackage: regional
13
14    specifics:
15      pennyStock:
16        version: 1
17        ruleId: 1002
18        ruleCategory: StockReview
19        ruleDescription: Rule Description
20        ruleDisplayName: pennyStock
21        dataEntities:
22          accounts:
23          products:
24          productType:
```

FIG. 8

```
connectors.yaml
  connectors:
    specifics:
      s3:
        connectorClass: S3Connector
        connectorType: s3
        connectorMode: ReadWrite
        authType: Kerberos
        connectorConfig:
          s3:
            endPoint: https://SERVER:PORT
            signerAlgorithm: S3SignerType
            credentialsProvider: org.apache.hadoop.fs.s3a.SimpleAWSCredentialsProvider
            fileSystemImpl: org.apache.hadoop.fs.s3a.S3AFileSystem
            sslEnabled: true
            customSparkSessionConfigs:
              "fs.s3a.fast.upload": true
        authConfig:
          kerberos:
            authenticationService: KERBEROS
            mutualAuthentication: true
      jdbc:
        connectorClass: OracleJDBCConnector
        connectorType: jdbc
        authType: Kerberos
        connectorConfig:
          jdbc:
            url: jdbc:oracle:thin:@//SERVER:PORT/SERVICE_NAME
            driver: oracle.jdbc.driver.OracleDriver
            user: USER
            cacheDataSet: true
            fetchSize: 10000
        authConfig:
          kerberos:
            authenticationService: KERBEROS
            mutualAuthentication: true
```

FIG. 9

```yaml
dataEntities:
  defaults:
    connector: s3
    format: parquet
    location: {?bucketName}/core_data/{?specifics}/{?lob}
  specifics:
    accounts:
    orders:
      filterString: FILE_DT between {?startDate} and {?endDate}
    trades:
      filterString: FILE_DT between {?startDate} and {?endDate}
    products:
      filterString: FILE_DT between {?startDate} and {?endDate}
    productType:
```

SYSTEM AND METHOD FOR QUALITATIVE AND QUANTITATIVE DATA ANALYSIS FOR GENERATING ALERTS

CROSS-REFERENCE TO RELATED APPLICATIONS

This application claims the benefit of priority from Indian Provisional Patent Application No. 202211013064, filed Mar. 10, 2022, which is herein incorporated by reference in its entirety.

TECHNICAL FIELD

This disclosure generally relates to data processing, and, more particularly, to methods and apparatuses for implementing a platform and language agnostic data processing module that implements a state-of-the-art platform designed and architected with cloud-native stack for performing qualitative and quantitative data analysis for generating intelligent alerts.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data monitoring, performance analysis, project tracking, and competitive analysis, to name but a few. In general, large enterprises, corporations, agencies, institutions, and other organizations are facing a continuing problem of handling, processing, and/or accurately describing a vast amount of data that are crucial to plan actions at store level or market/regional level in an efficient and expedited manner.

For example, one of the major challenges a conventional data monitoring architecture poses is that it does not have a well-defined roadmap for sales practices and does not keep up with the latest tech stack and needs constant upkeep for security vulnerability fixes and new regulations support. Moreover, the infrastructure may prove to be expensive, due to licensing costs and added support costs. Additionally, the architecture does not scale on demand. Especially since COVID-19, the fear and unrest brought by the pandemic caused market volume spikes of about 3 times which resulted in processing delays and heavily impacted the service-level agreements (SLAs). Delays in disseminating alerts not only means less time for supervisory managers to investigate but also alerts not reviewed in time may cause any profit and loss to be borne by an organization.

Also, the existing solutions provided by conventional monitoring platforms have limited customization capabilities. Due to this shortcoming, most of the existing reviews may not be used as is and may need custom solutions to be developed which may increase the time to build and time to market. In addition, today's monitoring platform may not be configured for integrating well with existing systems of an organization, or latest authentication mechanisms, or support test automation and CICD (continuous integration continuous development) pipeline, thereby failing to support faster releases and failing to provide essentials for a secure, reliable system.

Moreover, over time, as part of upgrades or design changes, several intermediaries get added which becomes laborious to govern by utilizing the conventional tools. For example, current solutions in the market for sales practices and suitability have a very rigid design and does not cater to customization needs without adding substantial boiler plate code. In addition, conventional monitoring platform also lacks support for automated unit and functional testing.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic data processing module that implements a state-of-the-art platform designed and architected with cloud-native stack for performing qualitative and quantitative data analysis for generating intelligent alerts, but the disclosure is not limited thereto.

For example, the various aspects, embodiments, features, and/or sub-components may also provide optimized processes of implementing a platform and language agnostic data processing module that implements a supervision post trade rules engine designed and architected with cloud-native stack for enhanced post-trade monitoring to identify potential sales practices violations, but the disclosure is not limited thereto. For example, the platform and language agnostic data processing module may be configured to provide a comprehensive technology architecture and plug-n-play framework to create various types for alerts; utilize a cloud native platform leveraging big data technologies for developing, auditing, and generating intelligent alerts; perform holistic risk assessment by performing qualitative and quantitative data analysis before generating alerts; manage supervision data in an object store and support generating alerts which utilize machine learning as part of alert configurations to reduce false positive alerts, etc., but the disclosure is not limited thereto.

According to an aspect of the present disclosure, a method for qualitative and quantitative data analysis by utilizing one or more processors along with allocated memory is disclosed. The method may include: accessing a plurality of data sources to extract a plurality of supervision data; creating a data model based on the plurality of supervision data; implementing a rule engine that is configured to apply qualitative and quantitative data analysis algorithm on the extracted plurality of supervision data and the data model; implementing artificial intelligence or machine learning algorithm to generate a knowledge graph based on the data model; detecting outlier behavior data from the plurality of supervision data by integrating the rule engine and the AI/ML algorithm; analyzing the outlier behavior data; generating alerts data based on analyzing the outlier behavior data; and transmitting the alerts data to a user computing device for taking remedial actions in correspondence with the alerts data.

According to a further aspect of the present disclosure, the data model may be configured to provide audit needs and required data warehousing capabilities for running models across multiple time periods, but the disclosure is not limited thereto.

According to yet another aspect of the instant disclosure, the method may further include: accessing object data from a cloud platform configured for providing caching mechanism when accessing relatively larger clunks of data for complex rule which need data across the multiple time periods.

According to a further aspect of the instant disclosure, the outlier behavior data and the alerts data indicate potential sales practice issues related to regulatory compliance of post trade supervision data, but the disclosure is not limited thereto.

According to an additional aspect of the instant disclosure, the rule engine may be configured to set rules corresponding to post trade data supervision ensuring FINRA (Financial Industry Regulatory Authority) and SEC (Securities and Exchange Commission) compliance, but the disclosure is not limited thereto.

According to yet another aspect of the instant disclosure, the rule engine may be configured to be portable to a cloud where the rule engine runs as a containerized application dynamically sharing resources for generating the alerts data, but the disclosure is not limited thereto.

According to yet another aspect of the instant disclosure, for every alert generated, the method may further include: generating a similarity metric that identifies how similar a newly generated alert is compared to already generated alerts; generating a pertinent metric that identifies how pertinent the newly generated alert and supporting data is compared to already generated alerts; and generating a risk metric that identifies how risky is a rule breach for the newly generated alert compared to which rule is breached from an average breach limit and a predetermined threshold.

According to an aspect of the present disclosure, a system for qualitative and quantitative data analysis is disclosed. The system may include: a processor; and a memory operatively connected to the processor via a communication interface, the memory storing computer readable instructions, when executed, may cause the processor to: access a plurality of data sources to extract a plurality of supervision data; create a data model based on the plurality of supervision data; implement a rule engine that is configured to apply qualitative and quantitative data analysis algorithm on the extracted plurality of supervision data and the data model; implement artificial intelligence or machine learning algorithm to generate a knowledge graph based on the data model; detect outlier behavior data from the plurality of supervision data by integrating the rule engine and the AI/ML algorithm; analyze the outlier behavior data; generate alerts data based on analyzing the outlier behavior data; and transmit the alerts data to a user computing device for taking remedial actions in correspondence with the alerts data.

According to a further aspect of the instant disclosure, the data model may be configured to provide audit needs and required data warehousing capabilities for running models across multiple time periods the processor may be further configured to: access object data from a cloud platform configured for providing caching mechanism when accessing relatively larger clunks of data for complex rule which need data across the multiple time periods.

According to an additional aspect of the instant disclosure, for every alert generated, the processor is further configured to: generate a similarity metric that identifies how similar a newly generated alert is compared to already generated alerts; generate a pertinent metric that identifies how pertinent the newly generated alert and supporting data is compared to already generated alerts; and generate a risk metric that identifies how risky is a rule breach for the newly generated alert compared to which rule is breached from an average breach limit and a predetermined threshold.

According to an aspect of the present disclosure, a non-transitory computer readable medium configured to store instructions for qualitative and quantitative data analysis is disclosed. The instructions, when executed, may cause a processor to perform the following: accessing a plurality of data sources to extract a plurality of supervision data; creating a data model based on the plurality of supervision data; implementing a rule engine that is configured to apply qualitative and quantitative data analysis algorithm on the extracted plurality of supervision data and the data model; implementing artificial intelligence or machine learning algorithm to generate a knowledge graph based on the data model; detecting outlier behavior data from the plurality of supervision data by integrating the rule engine and the AI/ML algorithm; analyzing the outlier behavior data; generating alerts data based on analyzing the outlier behavior data; and transmitting the alerts data to a user computing device for taking remedial actions in correspondence with the alerts data.

According to a further aspect of the instant disclosure, the data model may be configured to provide audit needs and required data warehousing capabilities for running models across multiple time periods, and the instructions, when executed, may further cause the processor to perform the following: accessing object data from a cloud platform configured for providing caching mechanism when accessing relatively larger clunks of data for complex rule which need data across the multiple time periods.

According to an additional aspect of the instant disclosure, for every alert generated, the instructions, when executed, may further cause the processor to perform the following: generating a similarity metric that identifies how similar a newly generated alert is compared to already generated alerts; generating a pertinent metric that identifies how pertinent the newly generated alert and supporting data is compared to already generated alerts; and generating a risk metric that identifies how risky is a rule breach for the newly generated alert compared to which rule is breached from an average breach limit and a predetermined threshold.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates an exemplary rule type using YAML configurations in accordance with an exemplary embodiment.

FIG. 9 illustrates exemplary data connectors using YAML configurations in accordance with an exemplary embodiment.

FIG. 10 illustrates exemplary data entities using YAML configurations in accordance with an exemplary embodiment.

FIG. 11 illustrates an exemplary alert logic in accordance with an exemplary embodiment.

DETAILED DESCRIPTION

Figure 1:
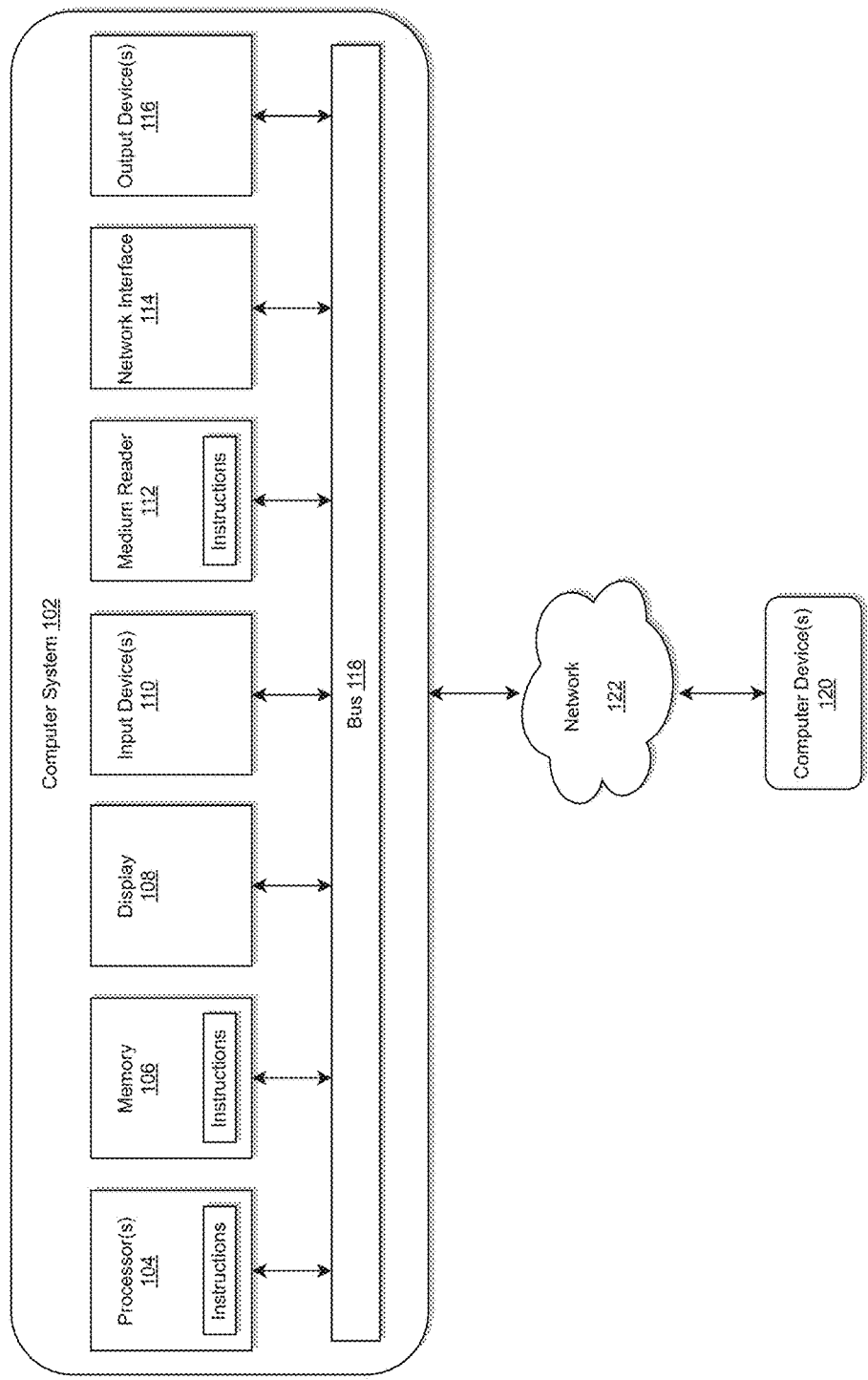
FIG. 1 illustrates a computer system for implementing a platform and language agnostic data processing module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic data processing module that implements a supervision post trade rules engine designed and architected with cloud-native stack for enhanced post-trade monitoring to identify potential sales practices violations in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration based languages.

Figure 2:
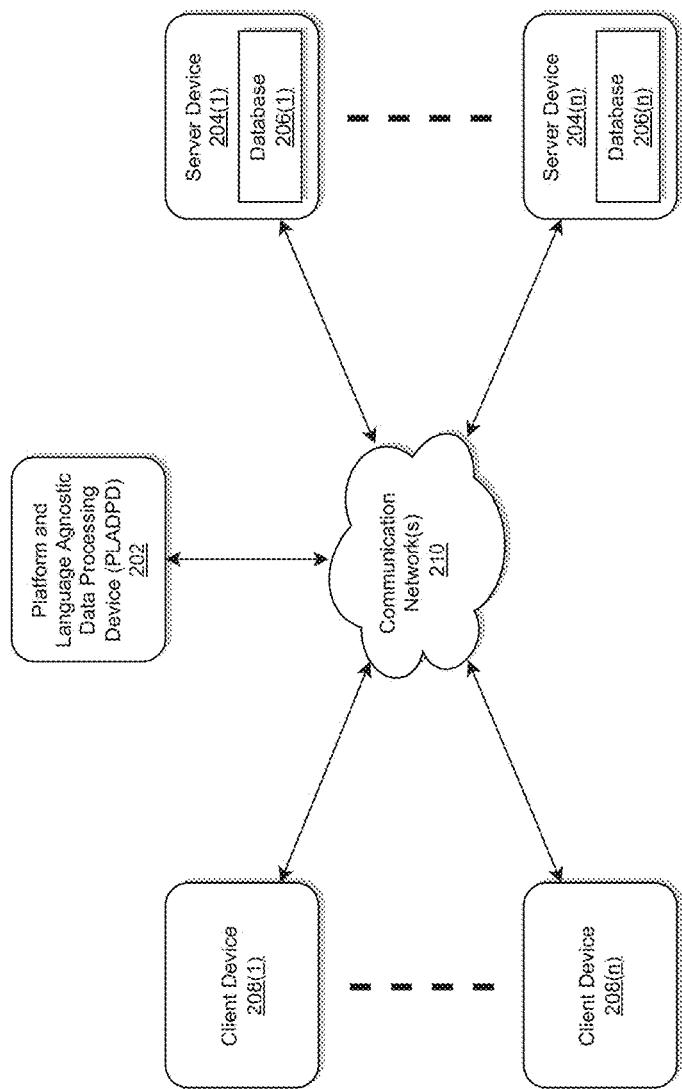
FIG. 2 illustrates an exemplary diagram of a network environment with a platform and language agnostic data processing device in accordance with an exemplary embodiment.

Referring to FIG. 2, a schematic of an exemplary network environment 200 for implementing a platform and language agnostic data processing device (PLADPD) of the instant disclosure is illustrated.

According to exemplary embodiments, the above-described problems associated with conventional approach of upgrading software application may be overcome by implementing a PLADPD 202 as illustrated in FIG. 2 that may implement a platform and language agnostic data processing module for implementing a supervision post trade rules engine designed and architected with cloud-native stack for enhanced post-trade monitoring to identify potential sales practices violations, but the disclosure is not limited thereto. For example, the PLADPD 202 may also provide optimized processes to implement a platform and language agnostic data processing module may be configured to provide a comprehensive technology architecture and plug-n-play framework to create various types for alerts; utilize a cloud native platform leveraging big data technologies for developing, auditing, and generating intelligent alerts; perform holistic risk assessment by performing qualitative and quantitative data analysis before generating alerts; manage supervision data in an object store and support generating alerts which utilize machine learning as part of alert configurations to reduce false positive alerts, etc., but the disclosure is not limited thereto.

The PLADPD 202 may be the same or similar to the computer system 102 as described with respect to FIG. 1.

The PLADPD 202 may store one or more applications that can include executable instructions that, when executed by the PLADPD 202, cause the PLADPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PLADPD 202 itself, may be located in virtual server(s) running in a cloud-based computing environment rather than being tied to one or more specific physical network computing devices. Also, the application(s) may be running in one or more virtual machines (VMs) executing on the PLADPD 202. Additionally, in one or more embodiments of this technology, virtual machine(s) running on the PLADPD 202 may be managed or supervised by a hypervisor.

In the network environment 200 of FIG. 2, the PLADPD 202 is coupled to a plurality of server devices 204(1)-204(n) that hosts a plurality of databases 206(1)-206(n), and also to a plurality of client devices 208(1)-208(n) via communication network(s) 210. A communication interface of the PLADPD 202, such as the network interface 114 of the computer system 102 of FIG. 1, operatively couples and communicates between the PLADPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PLADPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PLADPD 202 may be a standalone device or integrated with one or more other devices or apparatuses, such as one or more of the server devices 204(1)-204(n), for example. In one particular example, the PLADPD 202 may be hosted by one of the server devices 204(1)-204(n), and other arrangements are also possible. Moreover, one or more of the devices of the PLADPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PLADPD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the PLADPD 202 that may efficiently provide a platform for implementing a platform and language agnostic data processing module that implements a supervision post trade rules engine designed and architected with cloud-native stack for enhanced post-trade monitoring to identify potential sales practices violations, market manipulation or misconduct activities, etc., but the disclosure is not limited thereto. For example, the client devices 208(1)-208(n) in this example may include any type of computing device that can facilitate the implementation of the PLADPD 202 that provide optimized processes of implementing a platform and language agnostic data processing module that may be configured to provide a comprehensive technology architecture and plug-n-play framework to create various types for alerts; utilize a cloud native platform leveraging big data technologies for developing, auditing, and generating intelligent alerts; perform holistic risk assessment by performing qualitative and quantitative data analysis before generating alerts; manage supervision data in an object store and support generating alerts which utilize machine learning as part of alert configurations to reduce false positive alerts, etc., but the disclosure is not limited thereto.

The client devices 208(1)-208(n) may run interface applications, such as standard web browsers or standalone client applications, which may provide an interface to communicate with the PLADPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PLADPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PLADPD 202, the server devices 204(1)-204(n), or the client devices 208(1)-208(n), for example, may be configured to operate as virtual instances on the same physical machine. For example, one or more of the PLADPD 202, the server devices 204(1)-204(n), or the client devices 208(1)-208(n) may operate on the same physical device rather than as separate devices communicating through communication network(s) 210. Additionally, there may be more or fewer PLADPDs 202, server devices 204(1)-204(n), or client devices 208(1)-208(n) than illustrated in FIG. 2. According to exemplary embodiments, the PLADPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
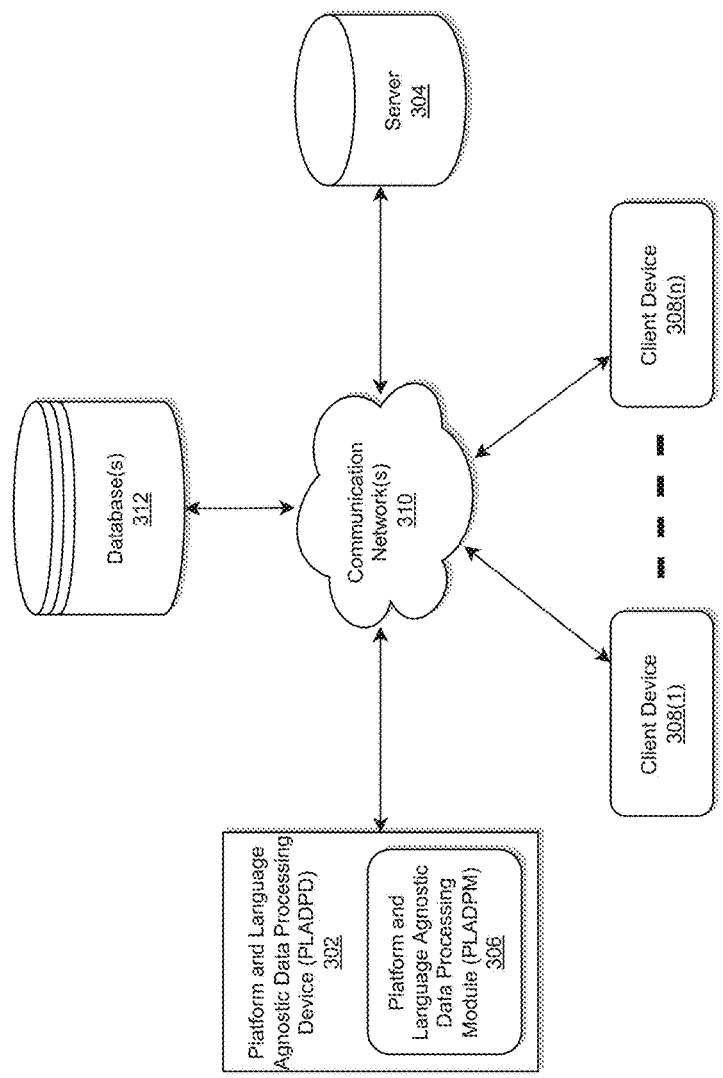
FIG. 3 illustrates a system diagram for implementing a platform and language agnostic data processing device having a platform and language agnostic data processing module in accordance with an exemplary embodiment.

FIG. 3 illustrates a system diagram for implementing a platform and language agnostic data processing device (PLADPD) having a platform and language agnostic data processing module (PLADPM) in accordance with an exemplary embodiment.

As illustrated in FIG. 3, the system 300 may include a PLADPD 302 within which a PLADPM 306 is embedded, a server 304, a database(s) 312, a plurality of client devices 308(1) . . . 308(n), and a communication network 310.

According to exemplary embodiments, the PLADPD 302 including the PLADPM 306 may be connected to the server 304, and the database(s) 312 via the communication network 310. The PLADPD 302 may also be connected to the plurality of client devices 308(1) . . . 308(n) via the communication network 310, but the disclosure is not limited thereto.

According to exemplary embodiment, the PLADPD 302 is described and shown in FIG. 3 as including the PLADPM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the PLADPM 306 may be configured to receive real-time feed of data from the plurality of client devices 308(1) . . . 308(n) via the communication network 310.

As will be described below, the PLADPM 306 may be configured to access a plurality of data sources (i.e., database(s) 312) to extract a plurality of supervision data; create a data model based on the plurality of supervision data; implement a rule engine that is configured to apply qualitative and quantitative data analysis algorithm on the extracted plurality of supervision data and the data model; implement artificial intelligence or machine learning algorithm to generate a knowledge graph based on the data model; detect outlier behavior data from the plurality of supervision data by integrating the rule engine and the AI/ML algorithm; analyze the outlier behavior data; generate alerts data based on analyzing the outlier behavior data; and transmit the alerts data to a user computing device for taking remedial actions in correspondence with the alerts data, but the disclosure is not limited thereto.

The plurality of client devices 308(1) . . . 308(n) are illustrated as being in communication with the PLADPD 302. In this regard, the plurality of client devices 308(1) . . . 308(n) may be "clients" of the PLADPD 302 and are described herein as such. Nevertheless, it is to be known and understood that the plurality of client devices 308(1) . . . 308(n) need not necessarily be "clients" of the PLADPD 302, or any entity described in association therewith herein. Any additional or alternative relationship may exist between either or both of the plurality of client devices 308(1) . . . 308(n) and the PLADPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the PLADPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The PLADPD 302 may be the same or similar to the PLADPD 202 as described with respect to FIG. 2, including any features or combination of features described with respect thereto.

Figure 4:
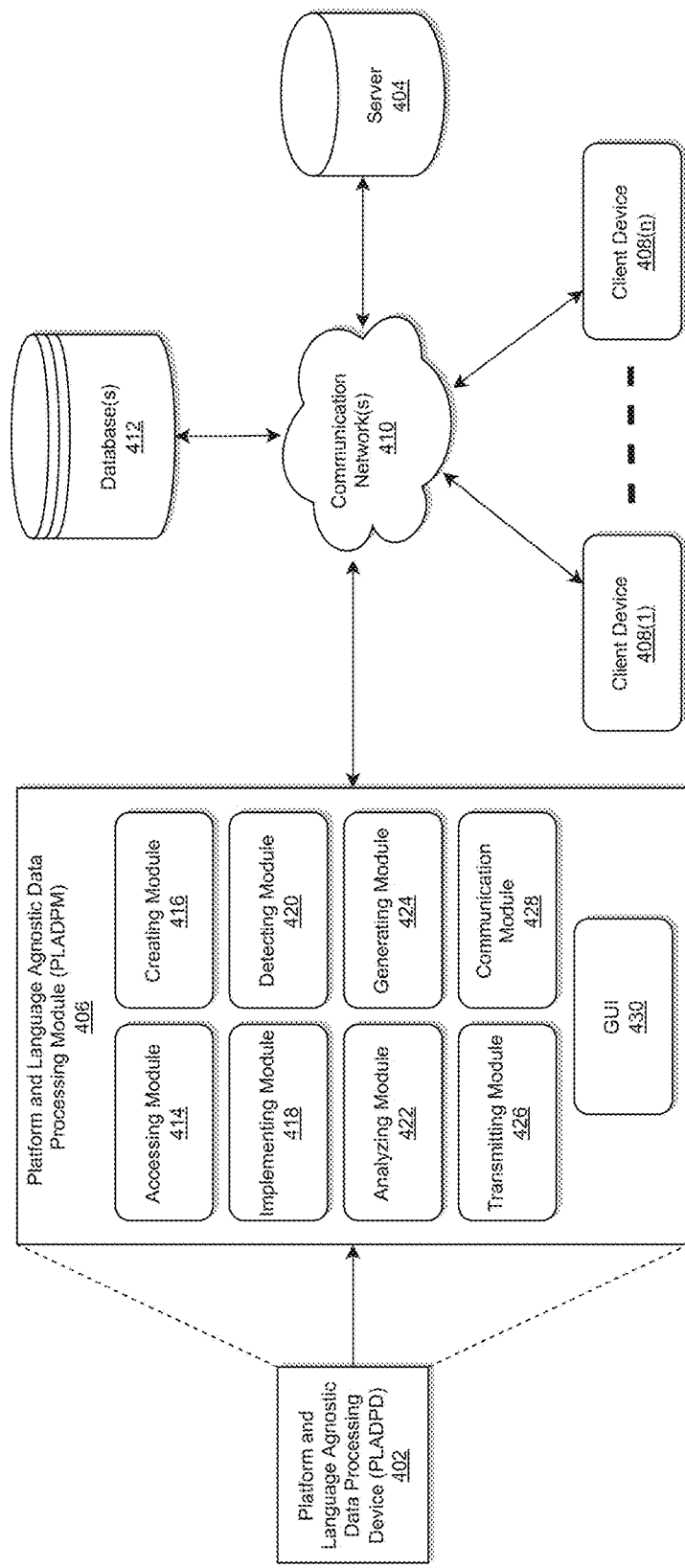
FIG. 4 illustrates a system diagram for implementing a platform and language agnostic data processing module of FIG. 3 in accordance with an exemplary embodiment.

FIG. 4 illustrates a system diagram for implementing a platform and language agnostic data processing module (PLADPM) of FIG. 3 in accordance with an exemplary embodiment.

According to exemplary embodiments, the system 400 may include a platform and language agnostic data processing device (PLADPD) 402 within which a PLADPM 406 is embedded, a server 404, database(s) 412, and a communication network 410.

According to exemplary embodiments, the PLADPD 402 including the PLADPM 406 may be connected to the server 404 and the database(s) 412 via the communication network 410. The PLADPD 402 may also be connected to the plurality of client devices 408(1)-408(n) via the communication network 410, but the disclosure is not limited thereto.

The PLADPM 406, the server 404, the plurality of client devices 408(1)-408(n), the database(s) 412, the communication network 410 as illustrated in FIG. 4 may be the same or similar to the PLADPM 306, the server 304, the plurality of client devices 308(1)-308(n), the database(s) 312, the communication network 310, respectively, as illustrated in FIG. 3.

According to exemplary embodiments, as illustrated in FIG. 4, the PLADPM 406 may include an accessing module 414, a creating module 416, an implementing module 418, a detecting module 420, an analyzing module 422, a generating module 424, a transmitting module 426, a communication module 428, and a GUI 430.

According to exemplary embodiments, each of the accessing module 414, creating module 416, implementing module 418, detecting module 420, analyzing module 422, generating module 424, transmitting module 426, and the communication module 428 of the PLADPM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, creating module 416, implementing module 418, detecting module 420, analyzing module 422, generating module 424, transmitting module 426, and the communication module 428 of the PLADPM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, creating module 416, implementing module 418, detecting module 420, analyzing module 422, generating module 424, transmitting module 426, and the communication module 428 of the PLADPM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, creating module 416, implementing module 418, detecting module 420, analyzing module 422, generating module 424, transmitting module 426, and the communication module 428 of the PLADPM 406 may be called via corresponding API.

The process may be executed via the communication module 428 and the communication network 410, which may comprise plural networks as described above. For example, in an exemplary embodiment, the various components of the PLADPM 406 may communicate with the server 404, and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the PLADPM 406.

According to exemplary embodiments, the accessing module 414 may be configured to access a plurality of data sources to extract a plurality of supervision data. Supervision data may include any post trade data that may need fiduciary or supervision controls in line with regulations. The comprehensive framework implemented by the PLADPM 406 may incorporate all aspects of the alert generation process right from the data ingestion, data filtering, alert detection, and alert distribution.

For example, according to exemplary embodiments, the creating module 416 may be configured to create a data model based on the plurality of supervision data. The implementing module 418 may be configured to implement a rule engine that is configured to apply qualitative and quantitative data analysis algorithm on the extracted plurality of supervision data and the data model.

According to exemplary embodiments, the implementing module 418 may be further configured to implement artificial intelligence or machine learning (AI/ML) algorithm to generate a knowledge graph based on the data model. The detecting module 420 may be configured to detect outlier behavior data from the plurality of supervision data by integrating the rule engine and the AI/ML algorithm. According to exemplary embodiments, the outlier behavior data and the alerts data may indicate potential sales practice issues related to regulatory compliance of post trade supervision data, but the disclosure is not limited thereto.

According to exemplary embodiments, the analyzing module 422 may be configured to analyze the outlier behavior data. The generating module 424 may be configured to generate alerts data onto the GUI 430 based on analyzing the outlier behavior data. The transmitting module 426 may be configured to transmit the alerts data to a user computing device (i.e., 408(1) . . . 408(n)) for taking remedial actions in correspondence with the alerts data.

According to exemplary embodiments, the data model may be configured to provide audit needs and required data warehousing capabilities for running models across multiple time periods, but the disclosure is not limited thereto.

According to exemplary embodiments, the accessing module 414 may be further configured to access object data from a cloud platform configured for providing caching mechanism when accessing relatively larger clunks of data for complex rule which need data across the multiple time periods.

According to exemplary embodiments, the rule engine may be configured to set rules corresponding to post trade data supervision ensuring FINRA (Financial Industry Regulatory Authority) and SEC (Securities and Exchange Commission) compliance, but the disclosure is not limited thereto.

According to exemplary embodiments, the rule engine may be configured to be portable to a cloud where the rule engine runs as a containerized application dynamically sharing resources for generating the alerts data, but the disclosure is not limited thereto.

According to exemplary embodiments, for every alert generated, the generating module 424 may be configured to generate a similarity metric that identifies how similar a newly generated alert is compared to already generated alerts; generate a pertinent metric that identifies how pertinent the newly generated alert and supporting data is compared to already generated alerts; and generate a risk metric that identifies how risky is a rule breach for the newly generated alert compared to which rule is breached from an average breach limit and a predetermined threshold.

According to exemplary embodiments, the supervision post trade rule engine implemented by the PLADPM 406 is a strategic state-of-the-art rules-based engine natively built on cloud leveraging big data technologies. It is a comprehensive framework to build out all fiduciary/supervision controls in line with the regulations. It incorporates all aspects of the alert generation process right from the data ingestion, data filtering, alert detection, and alert distribution.

The processing steps implemented by the PLADPM 406 involved in alert generation are decoupled, making changes in silos easier, without impacting the other components. The framework is designed for greater ease of scalability, speed, and stability.

The core engine framework may be implemented in Apache Spark and the underlying language may be Scala which is a productive and robust programming language for data analysis and large-scale data processing in Apache Spark, but the disclosure is not limited thereto. The modules implemented by the PLADPM 406 may be platform and language agnostic.

The rule engine implemented by the PLADPM 406 may be portable to public cloud like AWS EKS (but the disclosure is not limited thereto) wherein, it can run as a containerized application sharing resources effectively, thereby, reducing hosting infrastructure and automating scaling on-demand which is helpful during volume spikes without impacting the SLA. Additionally, it also makes for a resilient system that can self-heal ensuring high availability. This allows developers to focus on the application build itself promoting faster time to market.

Figure 5:
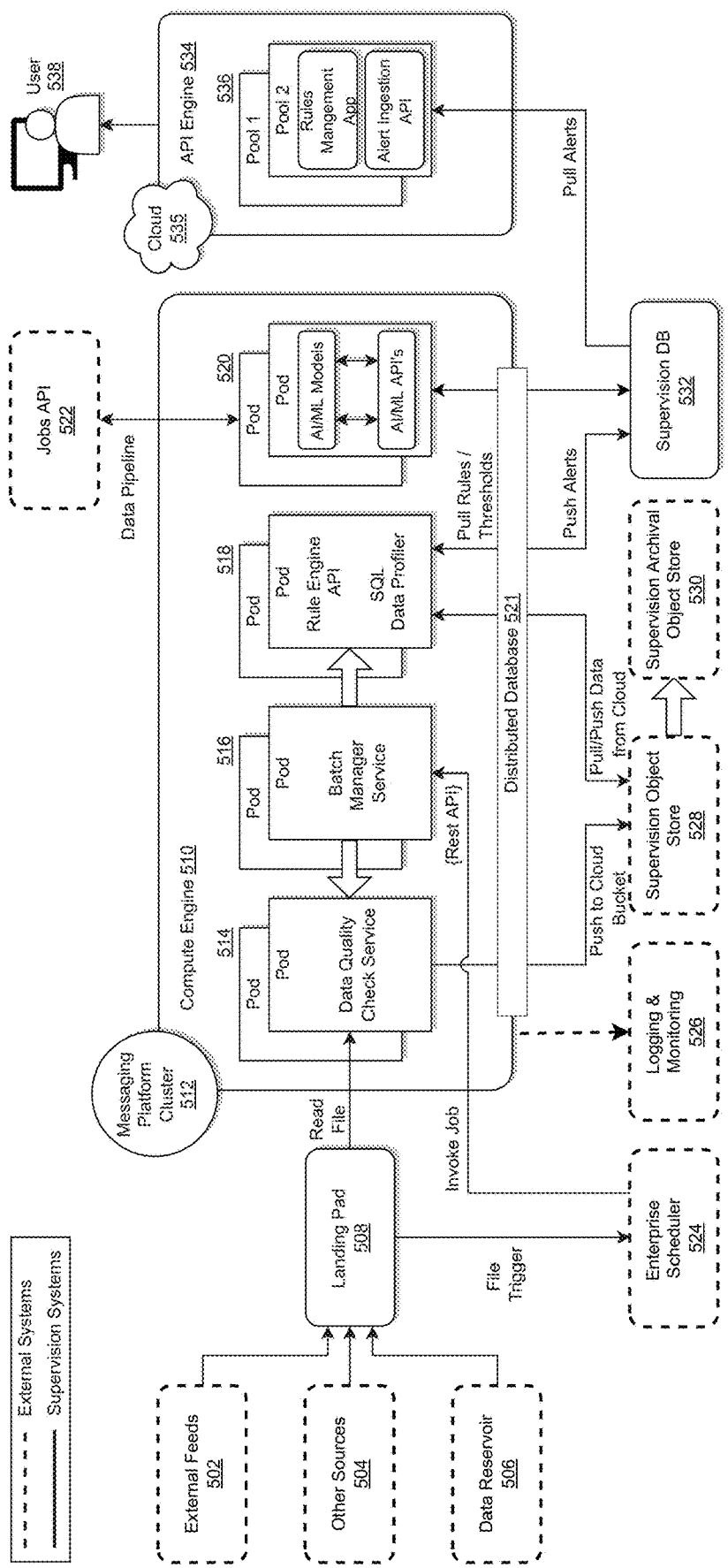
FIG. 5 illustrates an exemplary architecture implemented by the platform and language agnostic data processing module of FIG. 4 in accordance with an exemplary embodiment.

FIG. 5 illustrates an exemplary architecture 500 implemented by the PLADPM 406 of FIG. 4 in accordance with an exemplary embodiment. As illustrated in FIG. 5, the computing engine 510 implemented by the PLADPM 406 may be in communication with external systems, such as, external feeds 502, other sources 504, data reservoir 506, enterprise scheduler 524, logging and monitoring 526, supervision object store 528, supervision archival object store 530, and jobs API 522, but the disclosure is not limited thereto. The compute engine 510 also communicate with supervision systems as disclosed herein, such as, landing pad 508, messaging platform cluster 512, distributed database 521, supervision database 532, cloud 535, and API engine 534, but the disclosure is not limited thereto.

According to exemplary embodiments, the compute engine 510 may include a plurality of pods, e.g., pod 514 for data quality check service, pod 516 for batch manger service, pod 518 for pod rule engine API and SQL data profiler, and pod 520 for AI/ML models and AI/ML APIs.

According to exemplary embodiments, the API engine 534 may include a plurality of pods 536 for rules management application and alert ingestion API.

According to exemplary embodiments, enterprise scheduler 524 may be utilized to schedule a job for the landing pad 508 for file trigger and invoke the job (i.e., Spark job) via rest API for pod 516 for batch manager service. The logging and monitoring 526 may be a dashboard operatively connected with the messaging platform cluster 512 to help logging into the messaging platform cluster 512 and monitoring its processes. The supervision object store 528 may be an optimal data store (i.e., a cloud bucket like Amazon S3) operatively connected with the pod 514 so that data related to data quality check service may be pushed to the supervision object store 528 and pulled from the supervision object store for the pod 518 for pod rule engine API and SQL data profiler. Data from the supervision object store 528 may also flow to the supervision archival object store 530 (i.e., Amazon S3) for archiving the data received from the supervision object store 528. The supervision database 532 may be bi-directionally connected to: the pod 518 for the pod rule engine API and the SQL data profiler; the pod 520 for AI/ML models and AI/ML APIs; and the plurality of pods 536 included in the API engine 534 for rules management application and alert ingestion API. The user interactions (i.e., from user 538) with the API engine 534 may be hosted on the cloud 535.

Referring to FIGS. 4 and 5, according to exemplary embodiments, the data model generated by the PLADPM 406 may be specifically designed for supervision business needs to manage the supervision and suitability data in a cost effective and highly optimized manner. The data model is designed to meet the audit needs as well provide the required data warehousing capabilities for running models across various time periods. The object data may be accessed via Apache Ignite (but the disclosure is not limited thereto) which provides the caching mechanism when accessing huge clunks of data for complex rule which need data across multiple time periods.

Exemplary core entities in the data models are listed below in Table 1, but the disclosure is not limited thereto.

TABLE 1

| Core Data Model | | SPR Entities |
| --- | --- | --- |
| Clients | Assets Held Away | Alerts |
| Party | Annuities | Rules |
| Accounts | Investment Experience | Rule Factors |
| Balances | Market Data | Entities |
| Orders | Exchange Rates | Calendar Days |
| Positions | Ratings | Business Date |
| Trades | Representatives | Batch Logs |
| Products | Risk Oversight | |
| Tax Lots | Address | |

Rules engine implemented by the PLADPM 406 may provide a rule authoring and rule management system to provide business users with transparent user interface to view and manage rules lifecycle with capabilities to provide rule decision analysis and explainability of the decision flows.

The rule engine disclosed herein provides ability to quickly design and develop a very basic to complex supervision alerts using proprietary framework and data model to onboard alerts which are very granular and can be managed and audited with full change management and versioning support. The PLADPM 406 may utilize the configuration as code (CAC) concept to manage rule definition in YAML/JSON format (but the disclosure is not limited thereto) which provide business users (e.g., user 538 as illustrated in FIG. 5) full visibility of the rule logic reducing developer errors as well provide alerts analytics which as detect duplicate alerts and generate AI/ML based recommendation to reduce false positives using existing alerts metadata.

The PLADPM 406 may be configured to implement auto disposition of alerts based on threshold and historical disposition for similar alerts which can help during spike in alerts based on market data. The rule engine implemented by the PLADPM 406 also has capability to plugin in account/client risk data.

As illustrated in FIG. 5, the compute engine 510 forms the core of the rule engine deployed on private cloud (e.g., Private Cloud Kubernetes Platform—messaging platform cluster 512). Each rule is a workload running as pods 514, 516, 518, 520 orchestrated by Private Cloud Kubernetes Platform. The rule engine has the capability to run multiple rules in parallel. Each rule ingests the necessary financial data from, e.g., Mercury S3, which is an optimal data store, runs analytics and distributes the flagged records as alerts to the Gaia Oracle Service (GOS) database, but the disclosure is not limited thereto to these databases. Since alerts contain PI information necessary for review by compliance managers, they are distributed and stored in GOS which is also a private cloud, but the disclosure is not limited thereto.

The rule engine consists of a data loader module (e.g., landing pad 508) that supports ingress and egress of data from/to multiple sources 502, 504, 506 like S3, Oracle, Sybase and HDFS, but the disclosure is not limited thereto these data sources. The respective data source connectors take care of the authentication mechanisms required to connect to a particular data source. The data format and filter criteria are configurable by the user 538. This allows multiple data entities to be loaded at once irrespective of the source, target, and format.

The PLADPM 406 may also be configured to provide a UI (e.g., GUI 430), a Moneta Spring Boot application hosted on the cloud—Private Cloud Application Platform, but the disclosure is not limited thereto. The UI provides information on the alerts generated, alert details as well as alert trends and statistics. It also provides information on reference data such as thresholds and settings used by individual rules in the detection process.

The application logs are forwarded to for monitoring via Fluent Bit (but the disclosure is not limited thereto) which is a fast and light-weight data forwarder for Linux, OSX and BSD family operating systems, supporting different data formats, and multiple destinations.

Figure 6:
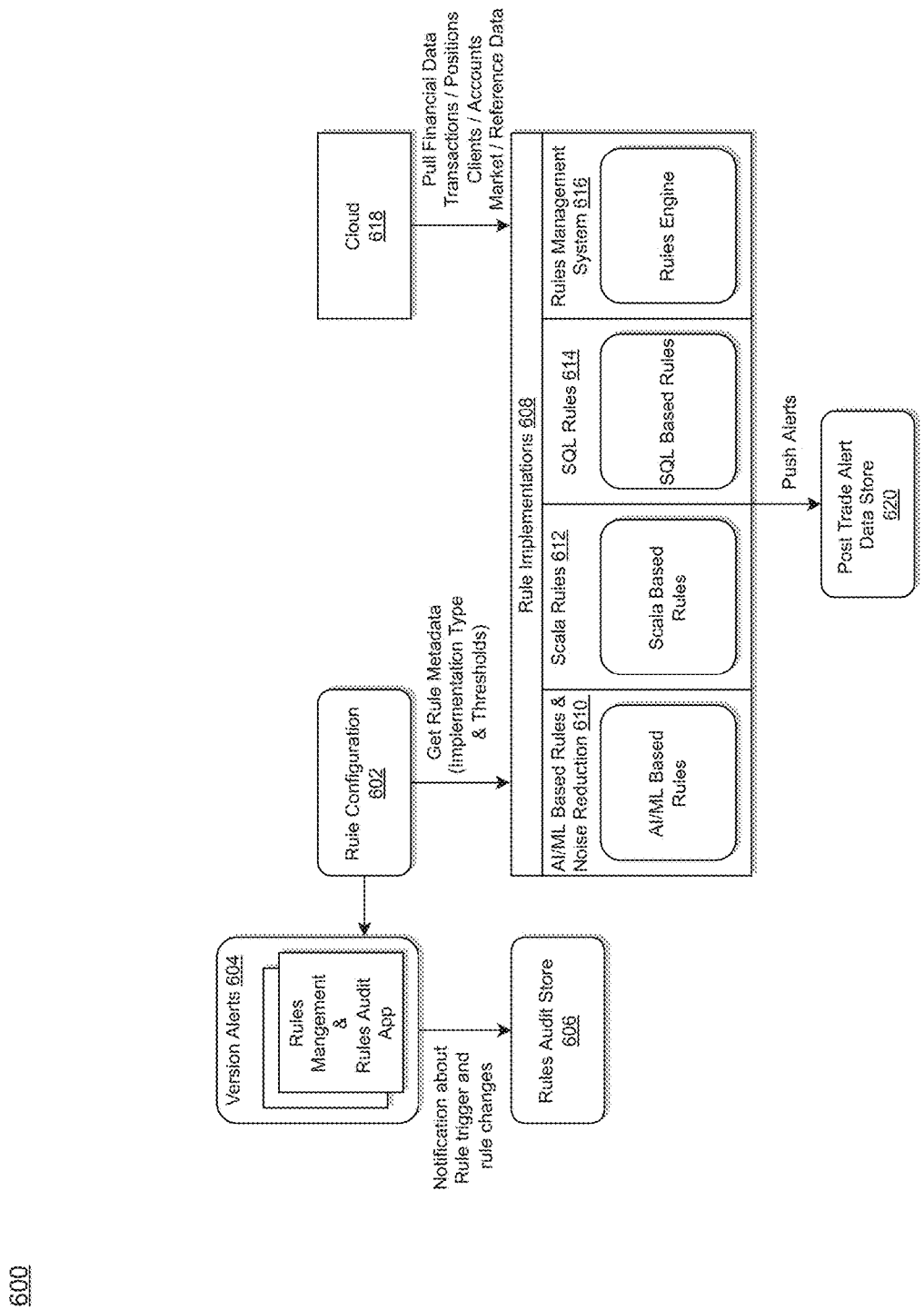
FIG. 6 illustrates an exemplary architecture for rule engine implemented by the platform and language agnostic data processing module of FIG. 4 in accordance with an exemplary embodiment.

FIG. 6 illustrates an exemplary architecture 600 for the rule engine disclosed herein implemented by the PLADPM 406 of FIG. 4 in accordance with an exemplary embodiment. The design for the rule engine is flexible to develop different implementations of rule engine. It comes with built in ML powered capabilities for outlier detection, noise reduction, warning generation, auto-closure, trend prediction, etc.

As illustrated in FIG. 6, the rule implementations 608 block may get rule metadata (i.e., implementation type and thresholds) from rule configuration 602 block; and also pulls financial data (i.e., transactions/positions data, clients/accounts data, market/reference data) from cloud 618. The version alerts 604 may also receive rule configuration data from the rule configuration 602 block and transmit data (i.e., notification about rule trigger and rule changes) to a rules audit store 606.

According to exemplary embodiments, the rule implementations 608 may include AI/ML based rules and noise reduction 610, Scala based rules 612, SQL based rules 614 and a rules management system 616 for rules engine. Data generated (i.e., push alerts) from rule implementations 608 is input to a post trade alert data store 620.

According to exemplary embodiments, the rule engine implemented by the PLADPM 406 offers different implementations of rules. For example, the framework implemented by the PLADPM 406 may allow for two types of rules, but the disclosure is not limited thereto. For example, Spark Scala rules are implemented in Scala for complex rules that involve more processing and Spark SQL based rules are implemented for plugging in a SQL query to the rule engine to generate alerts, but the disclosure is not limited thereto. For example, the PLADPM 406 may be configured to implement Drools rules, suitable for simple declarative rules and AI/ML based rules by leveraging Spark ML to filter out false positives, while also identifying anomalous, potentially fraudulent behavior that may be overlooked by human regulators, but the disclosure is not limited thereto.

According to exemplary embodiments, rule engine flow may include the following sequences: parse rule configuration; load data; pre-process data; generate alerts; post-process data; format data; and distribute alerts and related data, but the disclosure is not limited thereto.

The rule metadata including but not limited to, the rule type, data entities required by the alert, rule configurations such as thresholds are stored in YAML format. This rule YAML can also refer to other configurations such as custom inclusions, exclusions list present in other YAMLs, but the disclosure is not limited thereto.

The next step is to load the financial data such as accounts, transactions, products etc. These are loaded into Spark's in memory data frame object, which is used for structured data processing, but the disclosure is not limited thereto.

The data pre-processor step is an optional step and is a placeholder for filtering out data or any other transformations necessary.

The alert generation step is the place where the alert detection logic is programmed.

The data post-processor step is to apply and transformations to the alerts data or the related entities before distributing them.

The data formatter is the placeholder to define the alert attributes and related attributes to be distributed.

The last step is the distribution, where alert data formatted from the previous step is distributed as JSON or XML format to the required destination, but the disclosure is not limited thereto.

The rule engine framework may be built on the tenets of hexagonal architecture and ports and adapters, in which there is a clear distinction between the software's inside and outside parts. The central logic or domain forms the core whereas the UI, database etc., forms the outside part. This makes it independent from external services and ensures high maintainability. It enables a higher level of isolation, testability, and control over the code. According to exemplary embodiments, the rule engine core and entities form the central domain of the hexagonal architecture. The outside parts are a) data model and all the transformations and validations, making it agnostic to the type and source of data, b) data formats such as parquet, RDBMS, JSON, CSV, AVRO, c) data sources such as local host, Gaia Oracle Service (GOS), S3, resource files, d) authentication mechanisms like Kerberos, EPV, IDAnywhere, e) logging tools such as FluentBit and Splunk, but the disclosure is not limited thereto. The bridge between the core domain and the outside parts are the repositories which are the interfaces to work with the data and interactors that orchestrate the process.

According to exemplary embodiments, the hexagonal architecture implemented by the PLADPM 406 may be configured for: single responsibility modules; decoupling services/components; externalize infrastructure and domain concerns; isolate boundaries; shared contracts; dependencies point inwards, etc., but the disclosure is not limited thereto.

Figure 11:
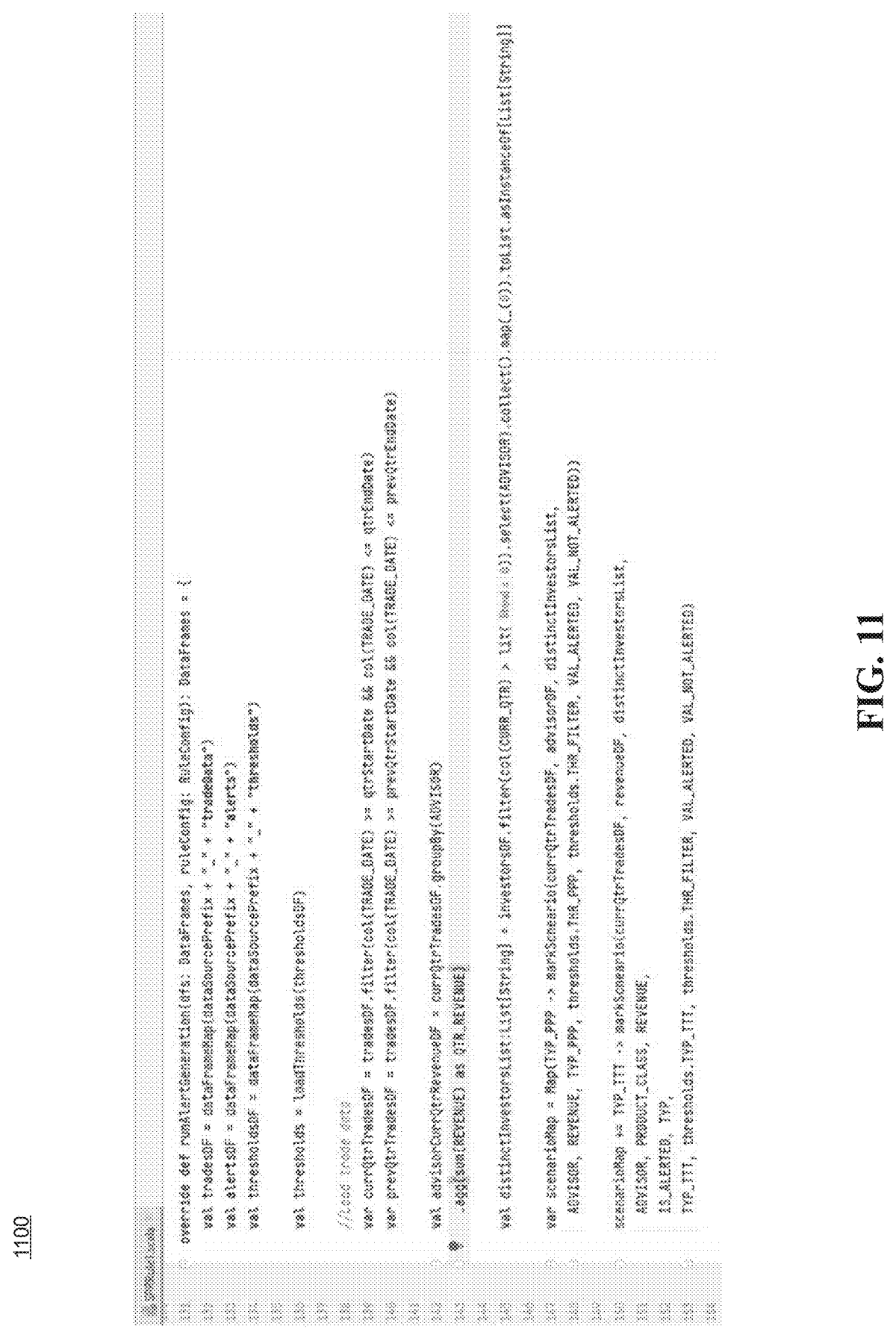
Figure 12:
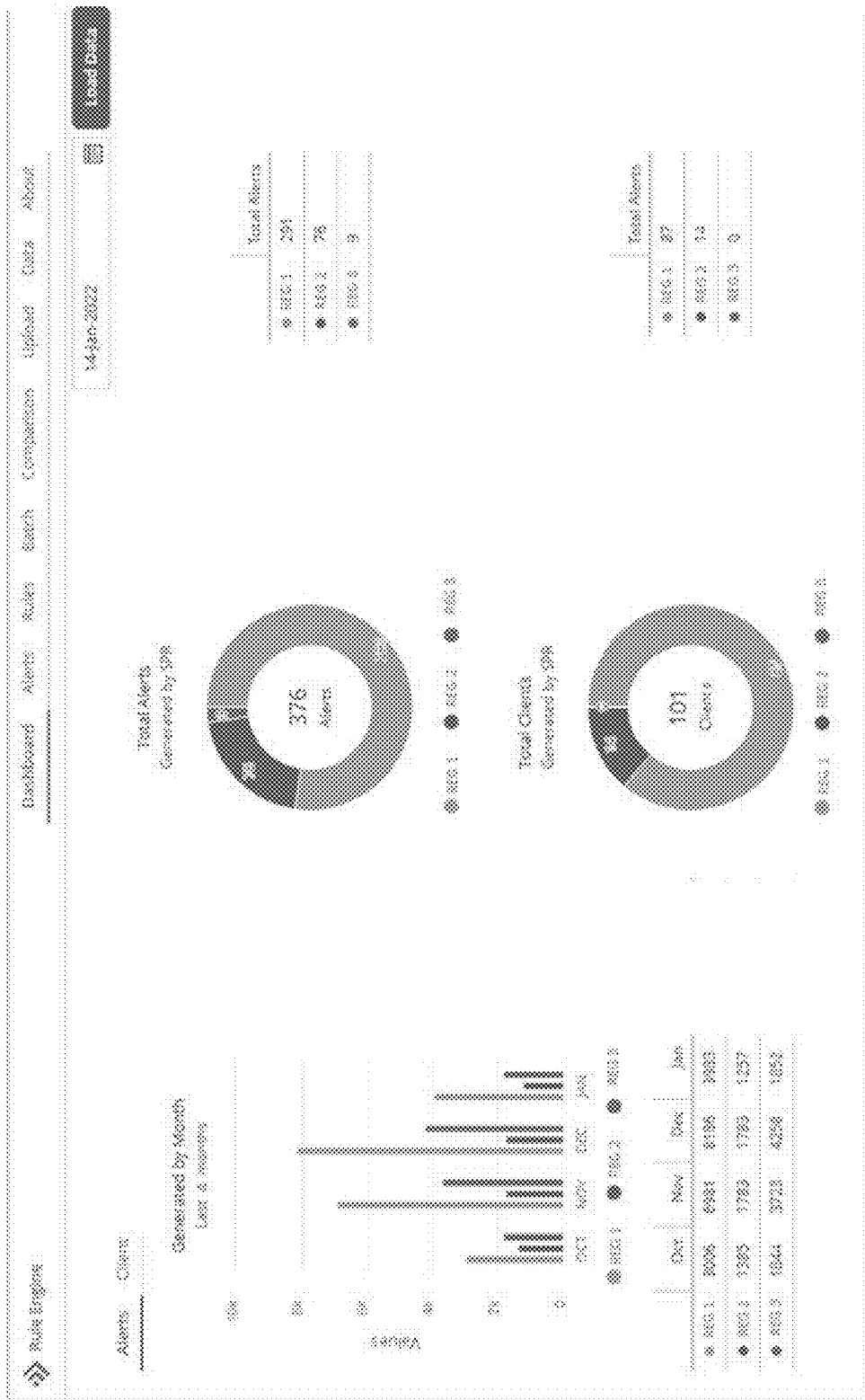
FIG. 12 illustrates an exemplary screen shot of an engine dashboard page in accordance with an exemplary embodiment.
Figure 13:
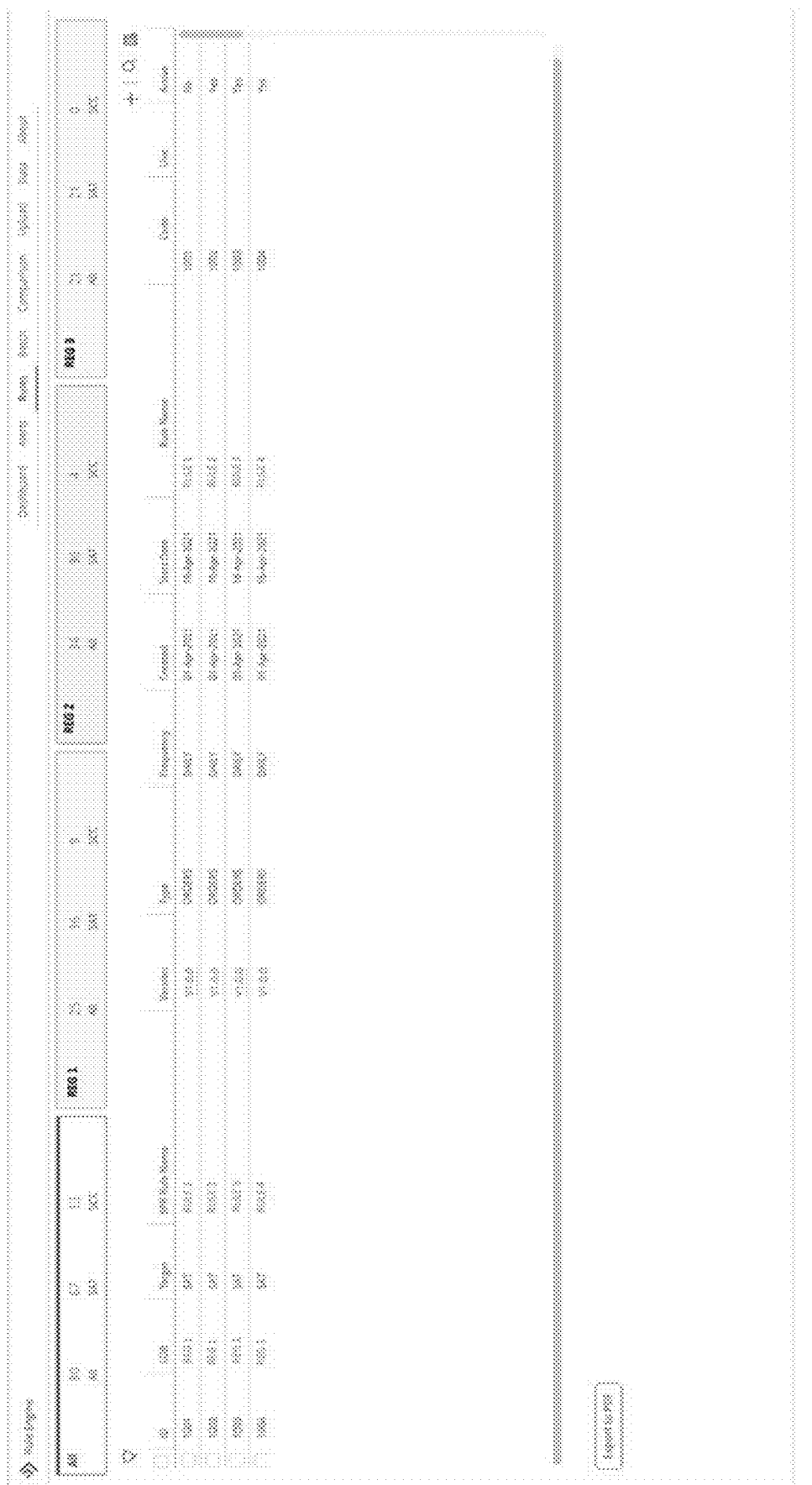
FIG. 13 illustrates another exemplary screen shot of rule summary in accordance with an exemplary embodiment.
Figure 14:
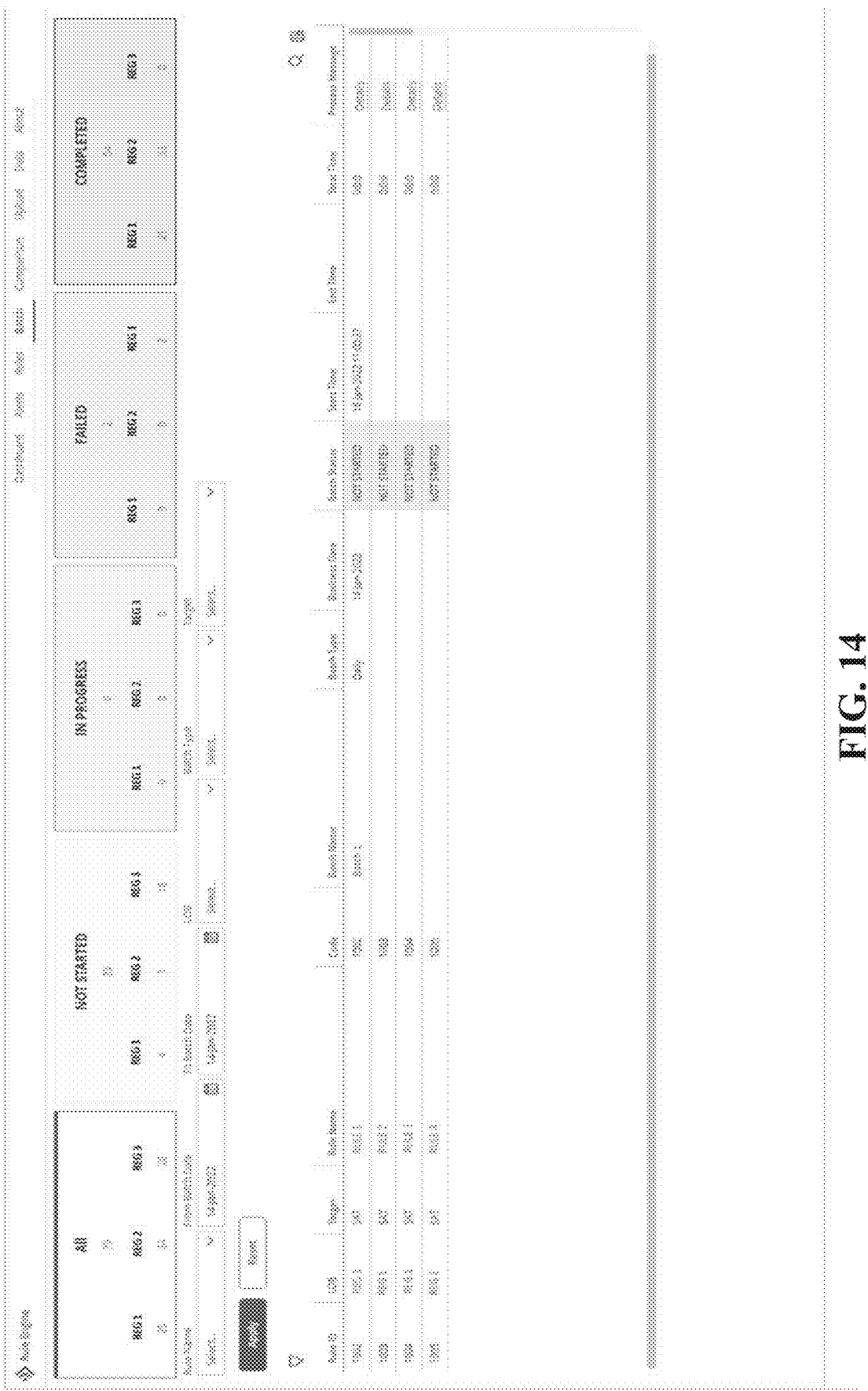
FIG. 14 illustrates another exemplary screen shot of rules monitoring/health check in accordance with an exemplary embodiment.

FIG. 8 illustrates an exemplary rule type 800 using YAML configurations in accordance with an exemplary embodiment as disclosed herein. FIG. 9 illustrates exemplary data connectors 900 using YAML configurations in accordance with an exemplary embodiment as disclosed herein. FIG. 10 illustrates exemplary data entities 1000 using YAML configurations in accordance with an exemplary embodiment as disclosed herein. FIG. 11 illustrates an exemplary alert logic 1100 in accordance with an exemplary embodiment. FIG. 12 illustrates an exemplary screen shot 1200 of an engine dashboard page in accordance with an exemplary embodiment as disclosed herein. FIG. 13 illustrates another exemplary screen shot 1300 of rule summary in accordance with an exemplary embodiment as disclosed herein. FIG. 14 illustrates another exemplary screen shot 1400 of rules monitoring/health check in accordance with an exemplary embodiment as disclosed herein.

Referring back to FIG. 4, according to exemplary embodiments, the rule engine implemented by the PLADPM 406 may capture the rule in a business friendly format which may be used for creating/authoring, versioning and getting the entire audit history of the rule. The rule may also run along with facility for rule simulation and deep audits/search. The user interface (i.e., GUI 43) also provides the monitoring capability for alert monitoring and provides the rule health check capabilities using the user interface. It also has support for versioning rules to managed rule lifecycle as and when rules are modified based on business requests.

According to exemplary embodiments, the PLADPM 406 may be configured to generate score for every alert generated. For example, the metrics used to derive the score may include similarity metrics, pertinent metrics, and risk metrics. The similarity metrics identifies how similar this alert is to alert alerts generated for this controls between defined time interval (Legend: N—Not Similar; S—Small Similarity; M—Medium Similarity; L—Large Similarity). The pertinent metrics identities how pertinent the alert and supporting data for this alert is (Legend: N—Not pertinent; S—Somewhat pertinent; M—Mostly pertinent; L—Largely pertinent). The risk metrics defines how risky is the rule breach based on the extent to which rule is breached from the average breach limit and threshold (Legend: N—None or minimal; S—Small Risk; M—Medium Risk; L—Large/significant Risk). These metrics tell the supervision users how potent a given alert is and points towards possibility of an alert being false positive based on historical data and utilizing machine learning techniques like anomaly detection and reinforcement learning. See, for example, FIGS. 12, 13, and 14.

Figure 7:
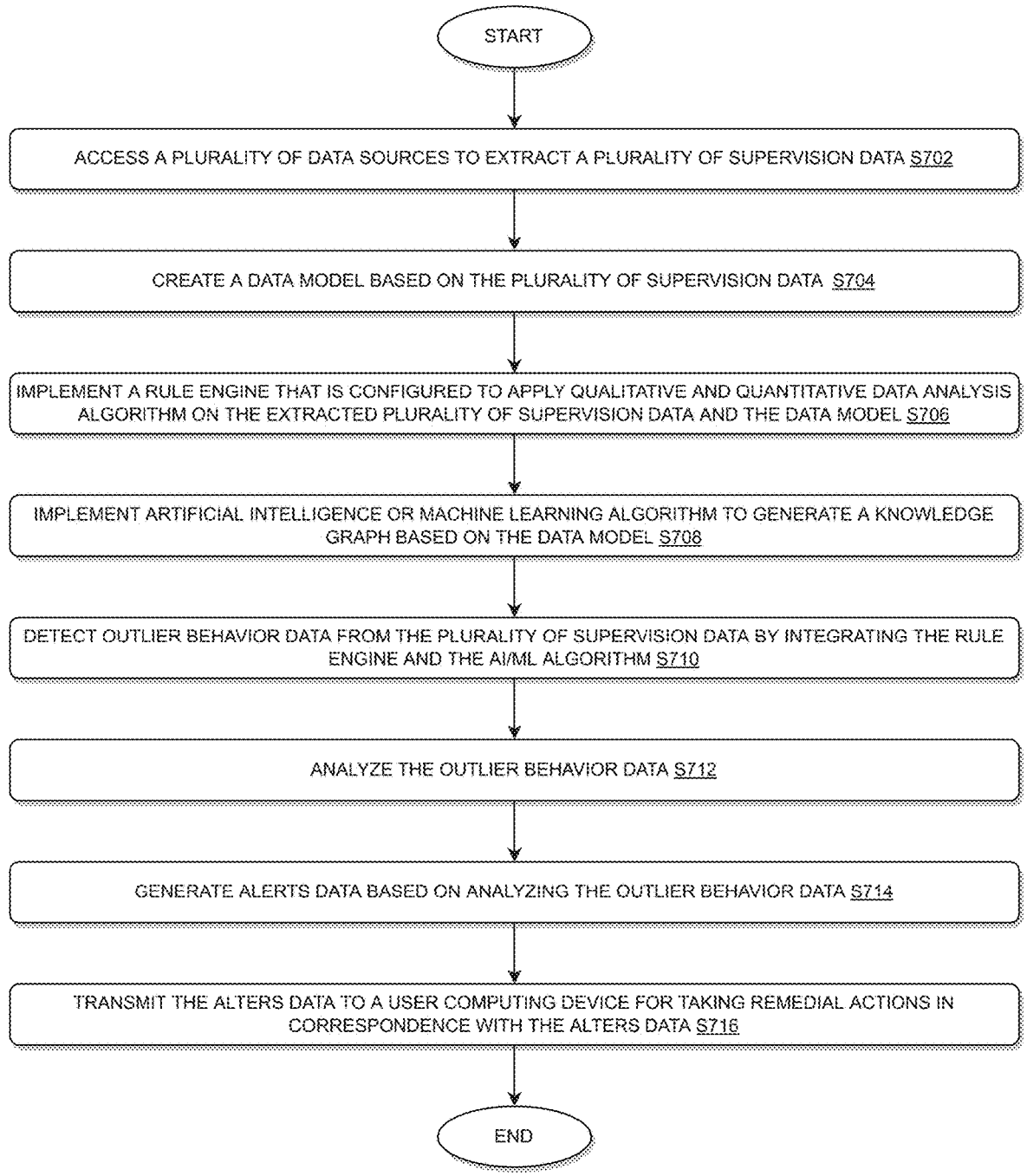
FIG. 7 illustrates a flow chart implemented by the platform and language agnostic data processing module of FIG. 4 in accordance with an exemplary embodiment.

FIG. 7 illustrates a flow chart 800 for performing qualitative and quantitative data analysis before generating intelligent alerts as implemented by the PLADPM 406 of FIG. 4 in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702, the process 700 may include accessing a plurality of data sources to extract a plurality of supervision data.

At step S704, the process 700 may include creating a data model based on the plurality of supervision data.

At step S706, the process 700 may include implementing a rule engine that is configured to apply qualitative and quantitative data analysis algorithm on the extracted plurality of supervision data and the data model.

At step S708, the process 700 may include implementing artificial intelligence or machine learning algorithm to generate a knowledge graph based on the data model.

At step S710, the process 700 may include detecting outlier behavior data from the plurality of supervision data by integrating the rule engine and the AI/ML algorithm.

At step S712, the process 700 may include analyzing the outlier behavior data.

At step S714, the process 700 may include generating alerts data based on analyzing the outlier behavior data.

At step S716, the process 700 may include transmitting the alerts data to a user computing device for taking remedial actions in correspondence with the alerts data.

According to exemplary embodiments, the data model may be configured to provide audit needs and required data warehousing capabilities for running models across multiple time periods, and the process 700 may further include: accessing object data from a cloud platform configured for providing caching mechanism when accessing relatively larger clunks of data for complex rule which need data across the multiple time periods.

According to exemplary embodiments, the outlier behavior data and the alerts data may indicate potential sales practice issues related to regulatory compliance of post trade supervision data, and the process 700 may include configuring the rule engine to set rules corresponding to post trade data supervision ensuring FINRA (Financial Industry Regulatory Authority) and SEC (Securities and Exchange Commission) compliance, but the disclosure is not limited thereto.

According to exemplary embodiments, the process 700 may further include configuring the rule engine in a manner such that the rule engine can be portable to a cloud where the rule engine runs as a containerized application dynamically sharing resources for generating the alerts data, but the disclosure is not limited thereto.

According to exemplary embodiments, for every alert generated, the process 700 may further include: generating a similarity metric that identifies how similar a newly generated alert is compared to already generated alerts; generating a pertinent metric that identifies how pertinent the newly generated alert and supporting data is compared to already generated alerts; and generating a risk metric that identifies how risky is a rule breach for the newly generated alert compared to which rule is breached from an average breach limit and a predetermined threshold.

According to exemplary embodiments, the PLADPD 402 may include a memory (e.g., a memory 106 as illustrated in FIG. 1) which may be a non-transitory computer readable medium that may be configured to store instructions for implementing a PLADPM 406 for qualitative and quantitative data analysis as disclosed herein. The PLADPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the PLADPM 406, 506 or within the PLADPD 402, may be used to perform one or more of the methods and processes as described herein. In a particular embodiment, the instructions may reside completely, or at least partially, within the memory 106, the medium reader 112, and/or the processor 104 (see FIG. 1) during execution by the PLADPD 402.

According to exemplary embodiments, the instructions, when executed, may cause a processor embedded within the PLADPM 406 or the PLADPD 402 to perform the following: accessing a plurality of data sources to extract a plurality of supervision data; creating a data model based on the plurality of supervision data; implementing a rule engine that is configured to apply qualitative and quantitative data analysis algorithm on the extracted plurality of supervision data and the data model; implementing artificial intelligence or machine learning algorithm to generate a knowledge graph based on the data model; detecting outlier behavior data from the plurality of supervision data by integrating the rule engine and the AI/ML algorithm; analyzing the outlier behavior data; generating alerts data based on analyzing the outlier behavior data; and transmitting the alerts data to a user computing device for taking remedial actions in correspondence with the alerts data. The processor may be the same or similar to the processor 104 as illustrated in FIG. 1 or the processor embedded within PLADPD 202, PLADPD 302, PLADPD 402, and PLADPM 406.

According to exemplary embodiments, the data model may be configured to provide audit needs and required data warehousing capabilities for running models across multiple time periods, and the instructions, when executed, may further cause the processor 104 to perform the following: accessing object data from a cloud platform configured for providing caching mechanism when accessing relatively larger clunks of data for complex rule which need data across the multiple time periods.

According to exemplary embodiments, the outlier behavior data and the alerts data may indicate potential sales practice issues related to regulatory compliance of post trade supervision data, and the instructions, when executed, may further cause the processor 104 to perform the following: configuring the rule engine to set rules corresponding to post trade data supervision ensuring FINRA (Financial Industry Regulatory Authority) and SEC (Securities and Exchange Commission) compliance, but the disclosure is not limited thereto.

According to exemplary embodiments, the instructions, when executed, may further cause the processor 104 to perform the following: configuring the rule engine in a manner such that the rule engine can be portable to a cloud where the rule engine runs as a containerized application dynamically sharing resources for generating the alerts data, but the disclosure is not limited thereto.

According to exemplary embodiments, for every alert generated, the instructions, when executed, may further cause the processor 104 to perform the following: generating a similarity metric that identifies how similar a newly generated alert is compared to already generated alerts; generating a pertinent metric that identifies how pertinent the newly generated alert and supporting data is compared to already generated alerts; and generating a risk metric that identifies how risky is a rule breach for the newly generated alert compared to which rule is breached from an average breach limit and a predetermined threshold.

According to exemplary embodiments as disclosed above in FIGS. 1-14, technical improvements effected by the instant disclosure may include a platform for implementing a platform and language agnostic data processing module that implements a supervision post trade rules engine designed and architected with cloud-native stack for enhanced post-trade monitoring to identify potential sales practices violations, but the disclosure is not limited thereto.

For example, according to exemplary embodiments as disclosed above in FIGS. 1-14, technical improvements effected by the instant disclosure may include a platform that may also provide optimized processes of implementing a platform and language agnostic data processing module may be configured to provide a comprehensive technology architecture and plug-n-play framework to create various types for alerts; utilize a cloud native platform leveraging big data technologies for developing, auditing, and generating intelligent alerts; perform holistic risk assessment by performing qualitative and quantitative data analysis before generating alerts; manage supervision data in an object store and support generating alerts which utilize machine learning as part of alert configurations to reduce false positive alerts, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for qualitative and quantitative data analysis by utilizing one or more processors along with allocated memory, the method comprising:
   implementing a platform and language agnostic data processing module (PLADPM) that implements a platform designed and architected with cloud-native stack for performing qualitative and quantitative data analysis for generating intelligent alerts, wherein the PLADPM including an accessing module, a creating module, an implementing module, a detecting module, an analyzing module, a generating module, and a transmitting module, wherein each of the module being called via corresponding application programming interface (API);
   accessing a plurality of data sources to extract a plurality of supervision data by calling the accessing module via a first API;
   creating a data model based on the plurality of supervision data by calling the creating module via a second API;

implementing a rule engine that is configured to apply qualitative and quantitative data analysis algorithm on the extracted plurality of supervision data and the data model by calling the implementing module via a third API, wherein an architecture of the rule engine includes built in machine learning powered capabilities for outlier detection, noise reduction, alerts generation, auto-closure, and trend prediction;

hosting the rule engine onto a public cloud and running the rule engine as containerized application sharing resources thereby reducing hosting infrastructure and automating scaling on-demand and implementing self-heal process;

training the data model with the extracted plurality of supervision data and corresponding historical data;

implementing artificial intelligence or machine learning algorithm (AI/ML) to generate a knowledge graph based on the trained data model by calling the implementing module via the third API;

generating the knowledge graph by calling the generating module via a fourth API;

detecting outlier behavior data from the plurality of supervision data by integrating the rule engine and the AI/ML algorithm by calling the detecting module via a fifth API;

analyzing the outlier behavior data by calling the analyzing module via a sixth API;

generating alerts data based on analyzing the outlier behavior data by calling the generating module via the fourth API;

transmitting the alerts data to a user computing device by calling the transmitting module via a seventh API; and taking remedial actions in correspondence with the alerts data.

2. The method according to claim 1, wherein the data model provides audit needs and required data warehousing capabilities; and running models across multiple time periods based on the audit needs and the required data warehousing capabilities.

3. The method according to claim 2, further comprising:

accessing object data from a cloud platform that provides caching mechanism when accessing relatively larger clunks of data for complex rule which need data across the multiple time periods.

4. The method according to claim 1, wherein the outlier behavior data and the alerts data indicate potential sales practice issues related to regulatory compliance of post trade supervision data.

5. The method according to claim 1, wherein the rule engine is configured to be portable to a cloud where the rule engine runs as a containerized application dynamically sharing resources and generates the alerts data.

6. The method according to claim 1, wherein for every alert generated, the method further comprising:

generating a similarity metric that identifies how similar a newly generated alert is compared to already generated alerts;

generating a pertinent metric that identifies how pertinent the newly generated alert and supporting data is compared to already generated alerts; and generating a risk metric that identifies how risky is a rule breach for the newly generated alert compared to which rule is breached from an average breach limit and a predetermined threshold.

7. A system for qualitative and quantitative data analysis, the system comprising:

a processor; and a memory operatively connected to the processor via a communication interface, the memory storing computer readable instructions, when executed, causes the processor to:

implement a platform and language agnostic data processing module (PLADPM) that implements a platform designed and architected with cloud-native stack for performing qualitative and quantitative data analysis for generating intelligent alerts, wherein the PLADPM including an accessing module, a creating module, an implementing module, a detecting module, an analyzing module, a generating module, and a transmitting module, wherein each of the module being called via corresponding application programming interface (API);

access a plurality of data sources to extract a plurality of supervision data by calling the accessing module via a first API;

create a data model based on the plurality of supervision data by calling the creating module via a second API;

implement a rule engine that is configured to apply qualitative and quantitative data analysis algorithm on the extracted plurality of supervision data and the data model by calling the implementing module via a third API;

host the rule engine onto a public cloud and running the rule engine as containerized application sharing resources thereby reducing hosting infrastructure and automating scaling on-demand and implementing self-heal process, wherein an architecture of the rule engine includes built in machine learning powered capabilities for outlier detection, noise reduction, alerts generation, auto-closure, and trend prediction;

training the data model with the extracted plurality of supervision data and corresponding historical data;

implement artificial intelligence or machine learning algorithm (AI/ML) to generate a knowledge graph based on the trained data model by calling the implementing module via the third API;

generate the knowledge graph by calling the generating module via a fourth API;

detect outlier behavior data from the plurality of supervision data by integrating the rule engine and the AI/ML algorithm by calling the detecting module via a fifth API;

analyze the outlier behavior data by calling the analyzing module via a sixth API;

generate alerts data based on analyzing the outlier behavior data by calling the generating module via the fourth API;

transmit the alerts data to a user computing device by calling the transmitting module via a seventh API; and take remedial actions in correspondence with the alerts data.

8. The system according to claim 7, wherein the data model provides audit needs and required data warehousing capabilities; and the processor runs models across multiple time periods based on the audit needs and the required data warehousing capabilities.

9. The system according to claim 8, wherein the processor is further configured to:

access object data from a cloud platform that provides caching mechanism when accessing relatively larger clunks of data for complex rule which need data across the multiple time periods.

10. The system according to claim 7, wherein the outlier behavior data and the alerts data indicate potential sales practice issues related to regulatory compliance of post trade supervision data.

11. The system according to claim 7, wherein the rule engine is configured to be portable to a cloud where the rule engine runs as a containerized application dynamically sharing resources and generates the alerts data.

12. The system according to claim 7, wherein for every alert generated, the processor is further configured to:
generate a similarity metric that identifies how similar a newly generated alert is compared to already generated alerts;
generate a pertinent metric that identifies how pertinent the newly generated alert and supporting data is compared to already generated alerts; and
generate a risk metric that identifies how risky is a rule breach for the newly generated alert compared to which rule is breached from an average breach limit and a predetermined threshold.

13. A non-transitory computer readable medium configured to store instructions for qualitative and quantitative data analysis, wherein, when executed, the instructions cause a processor to perform the following:
implementing a platform and language agnostic data processing module (PLADPM) that implements a platform designed and architected with cloud-native stack for performing qualitative and quantitative data analysis for generating intelligent alerts, wherein the PLADPM including an accessing module, a creating module, an implementing module, a detecting module, an analyzing module, a generating module, and a transmitting module, wherein each of the module being called via corresponding application programming interface (API);
accessing a plurality of data sources to extract a plurality of supervision data by calling the accessing module via a first API;
creating a data model based on the plurality of supervision data by calling the creating module via a second API;
implementing a rule engine that is configured to apply qualitative and quantitative data analysis algorithm on the extracted plurality of supervision data and the data model by calling the implementing module via a third API;
hosting the rule engine onto a public cloud and running the rule engine as containerized application sharing resources thereby reducing hosting infrastructure and automating scaling on-demand and implementing self-heal process, wherein an architecture of the rule engine includes built in machine learning powered capabilities for outlier detection, noise reduction, alerts generation, auto-closure, and trend prediction;
training the data model with the extracted plurality of supervision data and corresponding historical data;
implementing artificial intelligence or machine learning algorithm (AI/ML) to generate a knowledge graph based on the trained data model by calling the implementing module via the third API;
generating the knowledge graph by calling the generating module via a fourth API;
detecting outlier behavior data from the plurality of supervision data by integrating the rule engine and the AI/ML algorithm by calling the detecting module via a fifth API;
analyzing the outlier behavior data by calling the analyzing module via a sixth API;
generating alerts data based on analyzing the outlier behavior data by calling the generating module via the fourth API;
transmitting the alerts data to a user computing device by calling the transmitting module via a seventh API; and
taking remedial actions in correspondence with the alerts data.

14. The non-transitory computer readable medium according to claim 13, wherein the data model provides audit needs and required data warehousing capabilities and the processor runs models across multiple time periods, and wherein the instructions, when executed, further cause the processor to perform the following:
accessing object data from a cloud platform that provides caching mechanism when accessing relatively larger clunks of data for complex rule which need data across the multiple time periods.

15. The non-transitory computer readable medium according to claim 13, wherein the outlier behavior data and the alerts data indicate potential sales practice issues related to regulatory compliance of post trade supervision data.

16. The non-transitory computer readable medium according to claim 13, wherein the rule engine is configured to be portable to a cloud where the rule engine runs as a containerized application dynamically sharing resources and generates the alerts data.

17. The non-transitory computer readable medium according to claim 13, wherein for every alert generated, the instructions, when executed, further cause the processor to perform the following:
generating a similarity metric that identifies how similar a newly generated alert is compared to already generated alerts;
generating a pertinent metric that identifies how pertinent the newly generated alert and supporting data is compared to already generated alerts; and
generating a risk metric that identifies how risky is a rule breach for the newly generated alert compared to which rule is breached from an average breach limit and a predetermined threshold.

* * * * *